United States Patent
Hunt (10) Patent No.: US 9,563,848 B1
(45) Date of Patent: Feb. 7, 2017

(54) WEIGHTED MULTI-YEAR YIELD ANALYSIS FOR PRESCRIPTION MAPPING IN SITE-SPECIFIC VARIABLE RATE APPLICATIONS IN PRECISION AGRICULTURE

(71) Applicant: AGRIAN, INC., Fresno, CA (US)

(72) Inventor: Aaron Dale Hunt, Bellefonte, PA (US)

(73) Assignee: AGRIAN, INC., Fresno, CA (US)

( * ) Notice: Subject to any disclaimer, the term of this patent is extended or adjusted under 35 U.S.C. 154(b) by 0 days.

(21) Appl. No.: 15/202,683

(22) Filed: Jul. 6, 2016

(51) Int. Cl.
G06N 5/04 (2006.01)
G06N 7/00 (2006.01)

(52) U.S. Cl.
CPC .............. G06N 5/045 (2013.01); G06N 7/005 (2013.01)

(58) Field of Classification Search
CPC ...... G06N 5/045; A01G 1/001; A01B 79/005; A01B 79/02; Y10S 706/931
See application file for complete search history.

(56) References Cited

U.S. PATENT DOCUMENTS

| | | | | |
|---|---|---|---|---|
| 6,999,877 B1 * | 2/2006 | Dyer | ...... | G06Q 50/02 702/2 |
| 7,184,892 B1 * | 2/2007 | Dyer | ...... | G06Q 10/00 702/2 |
| 7,702,597 B2 * | 4/2010 | Singh | ...... | G06Q 10/04 706/21 |
| 9,113,590 B2 * | 8/2015 | Johnson | ...... | A01B 79/005 |
| 9,152,938 B2 * | 10/2015 | Lang | ...... | A01B 79/005 |
| 2002/0022929 A1 * | 2/2002 | Ell | ...... | A01B 79/005 702/5 |
| 2006/0074560 A1 * | 4/2006 | Dyer | ...... | A01B 79/005 702/5 |
| 2006/0282467 A1 * | 12/2006 | Peterson | ...... | G06Q 50/02 |
| 2015/0327440 A1 * | 11/2015 | Dybro | ...... | A01D 75/00 73/862.541 |
| 2016/0078569 A1 * | 3/2016 | Ethington | ...... | G06Q 10/06375 705/7.37 |
| 2016/0084813 A1 * | 3/2016 | Anderson | ...... | A01D 41/127 702/5 |
| 2016/0232621 A1 * | 8/2016 | Ethington | ...... | G06Q 10/06315 |
| 2016/0239709 A1 * | 8/2016 | Shriver | ...... | G01N 33/025 |
| 2016/0302351 A1 * | 10/2016 | Schildroth | ...... | A01B 79/005 |

OTHER PUBLICATIONS

Grain Yield Mapping: Yield Sensing, Yield Reconstruction, and Errors, by Arslan, 2002.*
Empirical regression models using NDVI, rainfall and temperature data for the early prediction of wheat grain yields in Morocco, by Balaghi, 2007.*

(Continued)

*Primary Examiner* — Stanley K Hill
*Assistant Examiner* — Thomas Fink
(74) *Attorney, Agent, or Firm* — Lazaris IP (57) ABSTRACT

A multi-year yield analysis in precision agriculture characterizes variables affecting crop yield to enable site-specific prescription mapping for a bounded field for one or more crops in the field. The multi-year yield analysis enables recommendations for variable-rate applications to the bounded field such as seeding, fertilizing, tilling, and applying crop treatments. The multi-year yield analysis evaluates each of coverage data, uniformity data, age data, and weather data related to crop yield in the bounded field.

30 Claims, 2 Drawing Sheets

(56) References Cited

OTHER PUBLICATIONS

Factors Influencing Wheat Yield and Variability: Evidence from Manitoba, Canada, by Carew, 2009.*
A Review of the Technologies for Mapping Within-field Variability, by Godwin, 2003.*
Scaling-up crop models for climate variability applications, by Hansen, 2000.*
Crop Yield as Affected by Uniformity of Sprinkler Irrigation System, by Li, 2011.*
Processing of Yield Map Data, by Ping, 2005.*
The use of a water budget model and yield maps to characterize water availability in a landscape, by Timlin, 2001.*

* cited by examiner

WEIGHTED MULTI-YEAR YIELD ANALYSIS FOR PRESCRIPTION MAPPING IN SITE-SPECIFIC VARIABLE RATE APPLICATIONS IN PRECISION AGRICULTURE

CROSS-REFERENCE TO RELATED PATENT APPLICATION(S)

None.

FIELD OF THE INVENTION

The present invention relates to site-specific variable rate applications in precision agriculture. Specifically, the present invention relates to a system and method of performing a multi-year crop yield analysis to generate prescription maps for variable rate applications in a field.

BACKGROUND OF THE INVENTION

Crop advisors, growers, and other responsible entities have a need for creating variable rate applications for crops and fields, such as for example seeding, fertilizer, herbicide, fungicide, pesticide, soil, and irrigation applications. Growers engage crop advisors and/or access automated processes for decision-making or recommendation-writing to help define a set of management zones for seeding events in a particular field. The crop advisor seeks to define these zones for a variable rate application based on a set of logged crop yield data. This is used to create area views of a field with similar patterns.

There are many existing methodologies for evaluating crop yield and for creating management zones for variable rate applications in precision agriculture. However, there is no approach currently available that enables an analysis of selected crop yield data from a detailed evaluation of weighted variables that influence or affect crop yield across multiple layers, or years, of event information, for one or more crops. There is also no approach that allows the crop advisor (or other user) to view resulting products such as yield stability, yield normalization and mean relative yield from such a weighted, multi-variable and multi-year crop yield analysis, for one or more crops in a field. Additionally, there is no currently-available approach that enables to the creation and definition of management zones, and the writing of recommendations, for a particular field using such a weighted, multi-variable evaluation of crop yield across multiple layers. There is likewise no currently-available way of combining each of these approaches in a comprehensive crop yield analytics framework to provide accurate decision-making for variable rate applications within precision agriculture.

BRIEF SUMMARY OF THE INVENTION

It is one objective of the present invention to provide a system and method of evaluating crop yield. It is another objective of the present invention to perform a multi-year yield analysis in the evaluation of crop yield. It is yet another objective of the present invention to perform multi-year crop yield analysis for site-specific prescription mapping and recommendation writing for variable applications for one or more crops. It is still another objective of the present invention to provide a framework for weighting different variables in yield event data for such a multi-year crop yield analysis.

The present invention is a weighted approach to evaluating crop yield event information for agricultural implementations. The present invention performs a multi-year crop yield analytical framework and process that examines multiple variables in crop yield data across multiple years of crop data, and generates one or more yield analytics that are used for follow-on agricultural activity. The present invention enables site-specific prescription mapping and recommendation writing for variable rate applications for this agricultural activity.

In one embodiment of the present invention, a method comprises receiving, as input data, a layer of yield event information representing a single crop for a bounded field, the at least one layer of yield event information comprised of a plurality of variables that include a) coverage data as a percentage of the bounded field covered by a crop, b) uniformity data as a variation factor in a crop yield across the bounded field, c) age data as a number of years since the yield event information was collected, and d) weather data that includes both a temperature value for a particular year, and a precipitation value for the at least one layer. The method also comprises analyzing the input data in one or more data processing modules within a computing environment in which the plurality of data processing modules are executed in conjunction with at least one processor, the one or more data processing modules configured to initialize one or more recommendations for a variable rate application for the bounded field based on a multi-year yield analysis of the yield event information, by 1) assigning a weight for the coverage data that decays at a rate beginning at a 90% coverage factor and approaching zero at a point between a 35% to 65% coverage factor, 2) assigning a weight for the uniformity data that decays at a linear rate starting between at an 80% uniformity factor and approaching zero at a 10% uniformity factor, 3) assigning a weight for the age data based on a collected age of the yield event when a total number of yield events exceeds a specified number of years, 4) assigning a weight for the weather data representing increasing decay as the precipitation value deviates further from a normal precipitation value, and as the temperature value deviates further from a normal temperature value, for a period of time represented by the at least one layer, and 5) combining the assigned weights for each of the plurality of variables into a single weighted value representing the yield event information. The method further comprises generating, as output data, one or more site-specific prescription maps of crop yield in the bounded field based on the multi-year yield analysis.

In another embodiment of the present invention, a system comprises a computing environment including at least one non-transitory computer-readable storage medium having program instructions stored therein and a computer processor operable to execute the program instructions to initialize one or more recommendations for a variable rate application for a bounded field based on a multi-year yield analysis of the yield event information within one or more data processing modules. The one or more data processing modules include a data weighting component configured to 1) assign a weight for each variable in a plurality of variables relating to a layer of yield event information that represents a single crop for the bounded field, the weight for a coverage variable calculated by decaying coverage data at a rate beginning at a 90% coverage factor and approaching zero at a point between a 35% to 65% coverage factor, the weight for a uniformity variable calculated by decaying uniformity data at a linear rate starting between at an 80% uniformity factor and approaching zero at a 10% uniformity factor, the weight for an age variable determined based on a collected age of the yield event when a total number of yield events exceeds a specified number of years, and the weight for a weather variable calculated by increasingly decaying weather data as the precipitation value deviates further from a normal precipitation value, and as the temperature value deviates further from a normal temperature value, for a period of time representing the layer, and 2) combine each assigned weights for each of the plurality of variables into a single weighted value representing the yield event information. The system also comprises a mapping component configured to generate one or more site-specific prescription maps of crop yield in the bounded field based on the multi-year yield analysis.

In a further embodiment of the present invention, a method of performing a multi-year yield analysis in precision agriculture comprises retrieving and initializing a plurality of input data, the plurality of input data including a layer of yield event information representing a single crop for a bounded field, the layer of yield even information comprised of a plurality of variables that include coverage data, uniformity data, age data, and weather data. The method also comprises calculating a weight for each variable in the plurality of variables, the weight for the coverage data representing decay of the coverage data at a rate beginning at a 90% coverage factor and approaching zero at a point between a 35% to 65% coverage factor, the weight of the uniformity data representing decay of the uniformity data at a linear rate starting between at an 80% uniformity factor and approaching zero at a 10% uniformity factor, the weight of the age data based on a collected age of the yield event when a total number of yield events exceeds a specified number of years, and the weight of the weather data representing increasing decay based as the precipitation value deviates further from a normal precipitation value, and on as the temperature value deviates further from a normal temperature value, for a time period representing the layer. The method further comprises calculating a combined weights for each of the plurality of variables into a single weighted value representing the yield event information, and mapping the crop yield in one or more site-specific prescription maps in the bounded field.

Other objects, embodiments, features, and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWING

The accompanying drawing, which is incorporated in and constitutes a part of this specification, illustrates several embodiments of the invention and together with the description, serves to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Figure 1:
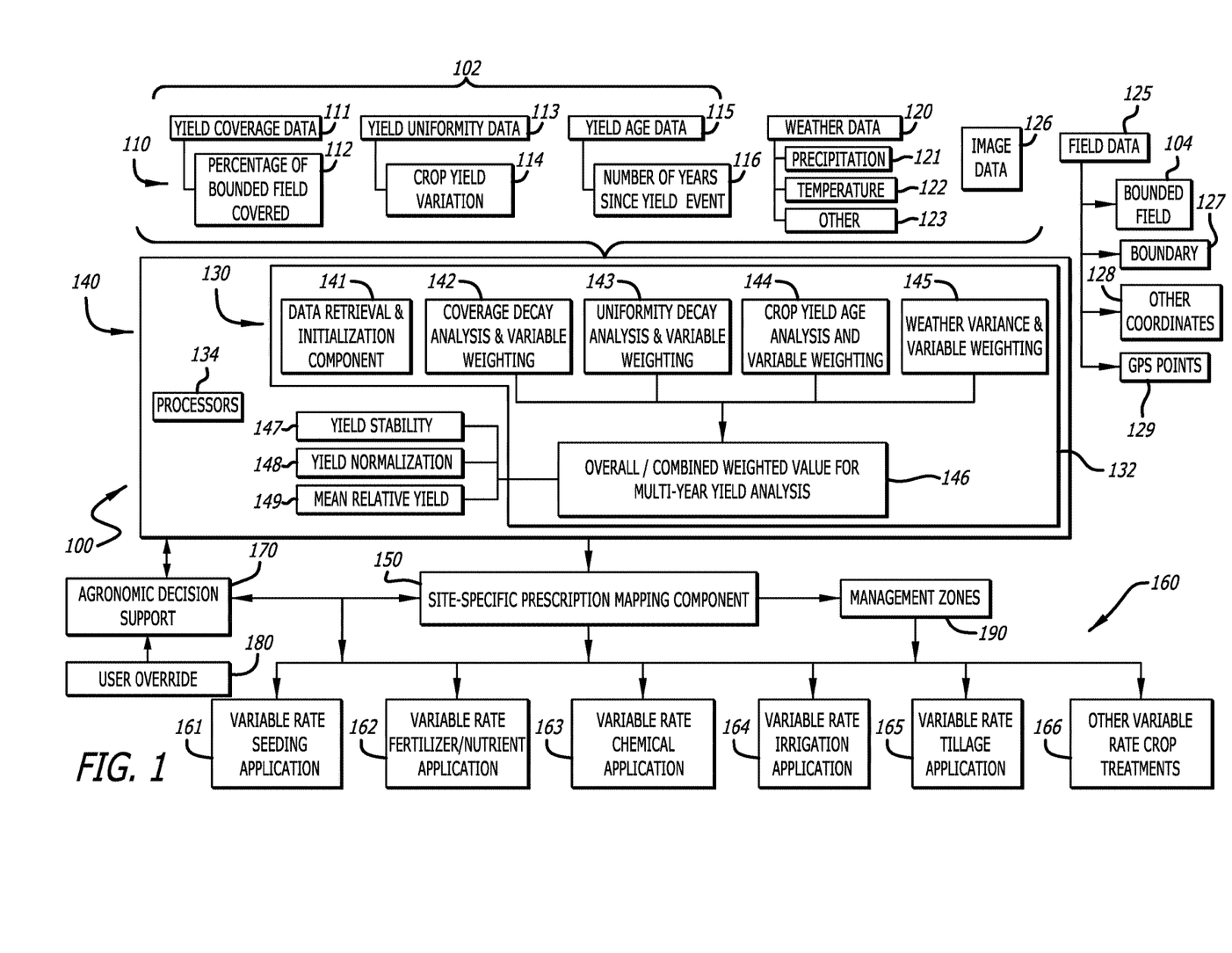
FIG. 1 is a block diagram of components of a multi-year crop yield evaluation framework according to one aspect of the present invention.

FIG. 1 is a system diagram illustrating block elements of a multi-year crop yield evaluation framework 100, according to the present invention. The multi-year crop yield evaluation framework 100 is performed within one or more systems and/or methods that includes several components, each of which define distinct activities for analyzing variables related to a crop yield 102 in a particular bounded field 104. The multi-year crop yield evaluation framework 100 is performed, in one embodiment of the present invention to prepare site-specific prescription mapping 150 that enables crop advisors (or other user or automated process) to define management zones 190 and determine variable rate applications 160 for one or more crops planted or to be planted in the particular bounded field 104.

The multi-year crop yield analytical framework 100 ingests, receives, requests, or otherwise obtains input data 110 comprising information about crop yield 102 in a bounded field 104 for one or more crops. Input data 110 may include one or more layers of yield event information representing crop yield 102 over multiple years or growing seasons, and for different crops growing or grown in the same field. Yield event information in the input data 110 may be comprised of several variables, and may be collected from a plurality of different sources. Variables include different components of a crop yield 102 or characteristics that influence crop yield 102, such as for example yield coverage data 111, yield uniformity data 113, and yield age data 115. Yield coverage data 111 represents a percentage 112 of the bounded field 104 that is covered by crop, and yield uniformity data 113 represents a variation factor 114 in a crop yield 102 across the bounded field 104. Age data 115 is the number of years 116 since a yield event or the amount of time that a crop output has been available.

Other crop-specific variables related to crop yield 102 are also possible, and therefore it is to be understood that the present invention contemplates that many other variables may comprise the input data 110 in addition to, or in place, variables such as yield coverage data 111, yield uniformity data 113, and yield age data 115. Likewise, it is to be understood that weights may be calculated and assigned to each of these variables, using many different mathematical formulas and analytical processes. Examples of such additional crop-specific variables include density data that reflects crop or seed characteristics such as plant population, row spacing, crop planting depth, root zone penetration, and seed population. Other possible variables include elevation, the amount and rate of artificial precipitation applied, an amount time to maturity or harvest, length of a growing season, and the actual yield itself. Still other variables include crop canopy and soil conditions such as crop moisture, crop temperature, soil moisture, and soil temperature.

Additionally, crop-specific variables may be comprised of different characteristics that enable quantification of the variable based on interactions between genetic, environmental, and managerial components. For example, plant and seed genetics perform differently in different regions, such as tropical climates versus the Midwest of the United States, and therefore accounting for genetics-by-environment interactions may produce a variable weight that accurately reflects its impact on decay. Similarly, management actions may not be constant, as large fields and large agribusinesses that own many farms may experience different managerial actions from field to field within the same agro-economic farm, and actions applied to different variations of the same crop (such as different varieties, cultivars, and hybrids) may differ based on climate, elevation, water level, etc.

Input data 110 may also include weather data 120, which is comprised of multiple values representing weather conditions in the bounded field 104. The weather data 120 may include a temperature value 121, and a precipitation value 122, and other values 123 for additional weather conditions. Different values of weather data 120 may be applied for times throughout a growing season or the particular year of layered event information. Weather data 120 may alternatively represent the particular year of layered event information as a whole. Regardless, weather data 120 may include historical climatological and meteorological data obtained from many different sources, such as one or more weather-related database collections maintaining information collected, for example, from remotely-sensed and/or in-field observation platforms and weather satellites.

Input data may also include image data 126, such as for example field-level and remotely-sensed data representing crop conditions in the bounded field 104. Sources of such image data 126 include satellite systems, unmanned aerial/remotely-piloted vehicles, manned aerial reconnaissance craft, and imaging equipment associated with field and farm equipment. Similar to weather data 120, the image data 126 may include information taken at multiple times throughout a growing season or the particular year of layered event information, and may alternatively represent the particular year of layered event information as a whole.

The input data 110 may also include field data 125, which may comprise information defining a field boundary 127 or other coordinates 128 of the bounded field 104. Regardless, it is to be noted that the geographical location of the bounded field 104 may be derived from the data defining a field boundary 127 or other coordinates 128, and that these may be represented in one or more GPS data points 129. The multi-year crop yield evaluation framework 100 may include a Global Positioning System (GPS), having components such as a GPS-enabled receiver, which detects signals relative to the bounded field 104 and receives the one or more GPS data points 129 to compute the field's precise position on Earth (or, a desired portion thereof). The GPS-enabled receiver may thereby extract and determine the geographical location of the field 104, or relevant sections of the field 104, from the field boundary 127 and/or other coordinates 128 in the GPS data points 129. Field data 125 may be used to access applicable input data 110, such as weather data 120 for a particular geographical location that includes the bounded field 104, and for presenting the site-specific prescription mapping 160 discussed further herein.

The input data 110 is applied to a plurality of data processing components 134 that comprise a multi-year crop yield analysis 140, and a site-specific prescription mapping function 150, within a computing environment 130. The computing environment 130 also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the multi-year crop yield evaluation framework 100 that are described in detail herein, and embodied in the one or more data processing components 134. It is to be understood that the information comprising the input data 110 may be stored or maintained on, and/or pulled from, a plurality of different servers, and that not all data may be contained within any one server environment. Similarly, various information in the input data 110 may be proprietary or obtained one or more third parties.

The one or more data processing components 132 may include a data retrieval and recommendation initialization component 141 that is configured to obtain and distribute the input data 110 for the various other functions within the multi-year crop yield analysis 140 and site-specific prescription mapping 150. The data retrieval and recommendation initialization component 141 is also configured to arrange and/or parse the input data 110 for the multi-year crop yield evaluation framework 100, and initialize the process of writing the one or more variable rate application recommendations 160.

The multi-year crop yield analysis 140 is configured to process input data 110 by calculating and assigning weights for the various variables in layered yield event information representing a crop yield 102 for a bounded field 104 for one or more crops. The data processing components 132 comprising the multi-year crop yield analysis 140 includes a coverage decay analysis and variable weighting component 142, configured to evaluate decay of yield coverage data 111. Yield coverage data 111 may be decayed at either a uniform or non-uniform decay rate. For example, decay may be weighted based on exponential decay, quadratic decay, logarithmic decay, or square rate decay, and may be either linear or non-linear. For example, and in one embodiment, yield coverage data 111 is decayed at an exponential rate beginning at a 90% coverage factor and approaching zero at a selected point between a 35% to a 65% coverage factor. For example, such a point may be a mid-point value between the 35% and 65% coverage factors. In another example, the point is at a 50% coverage factor. It is to be understood that the point may be selected based on any number of factors. Regardless, based on this decay analysis, a weight is calculated and assigned to the variable for yield coverage data 111.

The multi-year crop yield analysis 140 also includes a uniformity decay analysis and variable weighting component 143, configured to evaluate decay of uniformity data 113. In one embodiment, yield uniformity data is decayed at a linear rate starting between at an 80% uniformity factor and approaching zero at a 10% uniformity factor. Based on this decay analysis, a weight is calculate and assigned to the variable for uniformity data 113 to account for crop yield variation 114 in the overall yield analysis. As with coverage data, decay may be linear or non-linear and uniform or non-uniform, and weighted based on different approaches to evaluating decay.

The multi-year crop yield analysis 140 further includes a crop yield age analysis and variable weighting component 144. This component 144 is configured to evaluate yield age data 115 by calculating and assigning a weight based on a collected age of the yield event. For example, where a total number of yield events exceeds a specified number of years, a lower weight is assigned so that older yield data is modeled at lesser rate, and conversely more recently-collected data is modeled using a higher weight.

The multi-year crop yield analysis 140 may further evaluate yield age data 115 based on decay with respect to quality of data, i.e. the newer or fresher the product data, the more weight it is assigned. For example, for some input products such hybrid corn seed, the product is on the market for a certain number of years, after which that the value of that data specifically for genetic performance is greatly diminished. A decay function may therefore be applied to such age data that is, for example, smooth up until the year that the data no longer applies, and sharply reduces toward zero thereafter.

Additionally, the multi-year crop yield analysis 140 includes a weather variance and variable weighting component 145. In this component 145, weather data 120 is evaluated to calculate and assign a weight for decay based on a degree of deviation of the precipitation value from a normal or average precipitation value, and on a degree of deviation of the temperature value from a normal or average temperature value, for a time period such as a collection year, growing season, or particular crop growth stage. The weight assigned to weather data 120 therefore represents decay that increases based on how far the precipitation and temperature values have deviated from normal values for the particular year or layer being analyzed. The weighting analysis applied in weather variance and variable weighting component 145 may further account for different types of precipitation, such as rainfall and artificial precipitation from irrigation, and other weather values such as humidity and the like.

The multi-year crop yield analysis 140 further includes a component 146 that is configured to calculate a combined weighted value that reflects all weights for variables modeled in the input data 110. Multiple approaches for arriving at a combined weighted value are contemplated within the present invention. For example, the combined weighted value may represent an average weight of the different weights applied to each of the variables. One or more statistical processes and/or other mathematical formulas may also be applied to determine the combined weights. Regardless, it is to be understood that a single weight reflecting all of the factors impacting crop yield 102 for a particular year is devised out of the many different weights calculated for the plurality of variables in the input data 110.

It is to be understood that the calculation and assignment of a combined weight representing all weights assigned to variables in the input data 110 may be the product of one or more analytical functions and mathematical processes performed in the multi-year crop yield analysis 140, and may include many different approaches. For example, the present invention may analyze statistical probability models by applying one or more mathematical equations to the input data 110. Other mathematical formulas and processes may be applied, such as transfer functions to determine a best-fit for a series of data points, a regression analysis, or other approaches to summarize relationships between multiple variables to arrive a single combined weight.

The output(s) of the multi-year yield analysis 140 is applied to a site-specific prescription mapping component 150, configured to apply the weighted crop yield in a mapping function that enables interpretation of multi-year yield data and yield variability for an understanding of input rates in every zone of a bounded field 104. The output(s) may also be applied to other mapping functions, in one or more additional components configured to generate such maps. Output(s) of the multi-year yield analysis 140 may include crop yield analytics such as yield stability 147, yield normalization 148, and mean relative yield 149. Outputs may alternatively comprise a single numerical value for each sector of a bounded field 104 for which crop yield analysis is desired. Regardless, the output(s) are used in one aspect of the present invention to create visualizations of prescription maps of the bounded field 104.

One or both of the outputs of the multi-year analysis 140 and the site-specific prescription mapping component 150 may be applied to an agronomic decision support tool 170 that is configured to allow access to one or more automated processes for agricultural decision-making and recommendation-writing, such as creating and defining management zones from the multi-year crop yield analysis. The agronomic decision support tool also enables a user to input and/or select one or more of the variables, for automatically defining a set of management zones 190 that each have a specific yield potential. A management zone 190 may be defined for a seeding event, a fertilizer/nutrient treatment event, a chemical treatment event, a tillage event, and irrigation event, and for any other crop activity for a bounded field 104. Management zones 190 may therefore be used to determine variable-rate applications in the bounded field 104 for these crop activities, and create variable rate events based on those applications, as well as prepare recommendations for those events.

The agronomic decision support tool 170 may include a function enabling a user override 180. Such a user override 180 allows a user, for example a crop advisor, to assign specific weights to each variable in the input data, and perform other tasks such as select appropriate variables, and define prescription mapping attributes and coordinates of the bounded field 104 or portions of the bounded field 104, for finer crop yield analytics.

A user assigns specific weights to the plurality of variables to introduce further specificity into the multi-year yield analysis 140. A yield layer may be weighted in a default condition by how far off the weather data was from a particular normality in the year it was collected, such as by looking at the weather from that year against the 30-year normal (or any other benchmark), and the further off from the normal average, the lower the weight assigned to the yield layer. However, the user may assign a weight to the multi-year yield analysis 140 based on long-range weather predictions or worse/best case scenarios. The user may select what weather conditions he or she would like to favor (or apply the higher weighting to). The user may select a higher weighting to dry or wet conditions as well as hot or cold conditions, and not the default average conditions. The user may therefore weight weather differently based on the specific weather conditions experienced, and/or based on the crop variety, cultivar, or hybrid planted. For example, a higher weight may be assigned to a cold-weather, irregular El Niño-Southern Oscillation (ENSO), or where a yield represents a drought-tolerant crop varietal in a particular low-moisture weather condition.

The user override 180 may therefore also enable a user to specify an intended crop (or variety, cultivar, or hybrid thereof) when calculating the weather variable weighting. In this case, the multi-year yield analysis 140 is configurable to weight yield layers with similar crops or varieties with a higher weight than yield layers not sharing similar parameters. As an example of this override 180, assume that a corn crop performs better in dryer conditions than a soybean crop. The weather variable may be assigned a weight to favor the dryer conditions for corn, and normal for soybeans. In a further example, if it is known that a given variety, cultivar or hybrid of corn prefers colder weather, weather may be weighted higher to favor previous years based on previous plantings that included colder weather variations.

Site-specific prescription mapping 150 may be used for developing, as noted above, variable rate applications 160 for the bounded field 104. Variable rate applications may include a variable rate seeding application 161 to assist a grower in determining a rate or rates for seeding the bounded field 104 for one or more crops. Variable rate applications may also include a variable rate fertilizer/nutrient application 162 to assist the grower in determining a fertilizer or other nutrient application rate for different areas of the bounded field 104. Similarly, outputs of variable rate applications are possible for chemical applications 163, irrigation applications 164, tillage 165, and other crop treatments 166, such as for example pesticides, herbicides, biological treatments, and the like.

Variable rate applications may also related to type, timing, and volume of equipment usage for agricultural activities such as seeding in the bounded field 104. For example, crop advisors, growers and other users (automated or otherwise) may apply the outputs of the multi-year crop yield analysis 140 to adjust a timing, volume, location and type of irrigation applied to different sectors of a bounded field 104. Similarly, the outputs of the multi-year crop yield analysis 140 may be applied to inform tillage activities in different sectors of the bounded field 104, and determine specific equipment to be used at particular times, and for different crops or variations thereof in the bounded field 104. The agronomic decision support tool 170 may be configured to generate many different types of recommendations for these variable rate applications 160 for the user to apply to the bounded field 104.

The agronomic decision support tool 170 may be configured to generate site-specific prescription maps for visual representation to users, for example on a graphical user interface, and users may be able to configure settings for, and view various aspects of, the multi-year crop yield analysis 140 using a display on such graphical user interfaces, and/or via web-based or application-based modules. Tools and pull-down menus on such a display (or in web-based or application-based modules) may also be provided to customize the input data 110, as well as to modify the weightings applied to the different selected variables in the input data 110 as noted above. In addition to desktop, laptop, and mainframe computing systems, users may access the agronomic decision support tool 170 using applications resident on mobile telephony, tablet, or wearable computing devices.

As suggested above, the agronomic decision support tool 170 also allows users to view specific analytical outputs from the multi-year crop yield analysis 140. Crop advisors, growers, and other users may view resulting products such as yield stability 147, yield normalization 148, and mean relative yield 149 using the agronomic decision support tool 170. Similarly, users can view displays of weightings calculated and manually adjust these as needed. Users may also be able to manually adjust the variables of input data 110 themselves to further fine-tune the resulting products, as well as the output prescription mapping, management zones, and variable rate recommendations.

Figure 2:
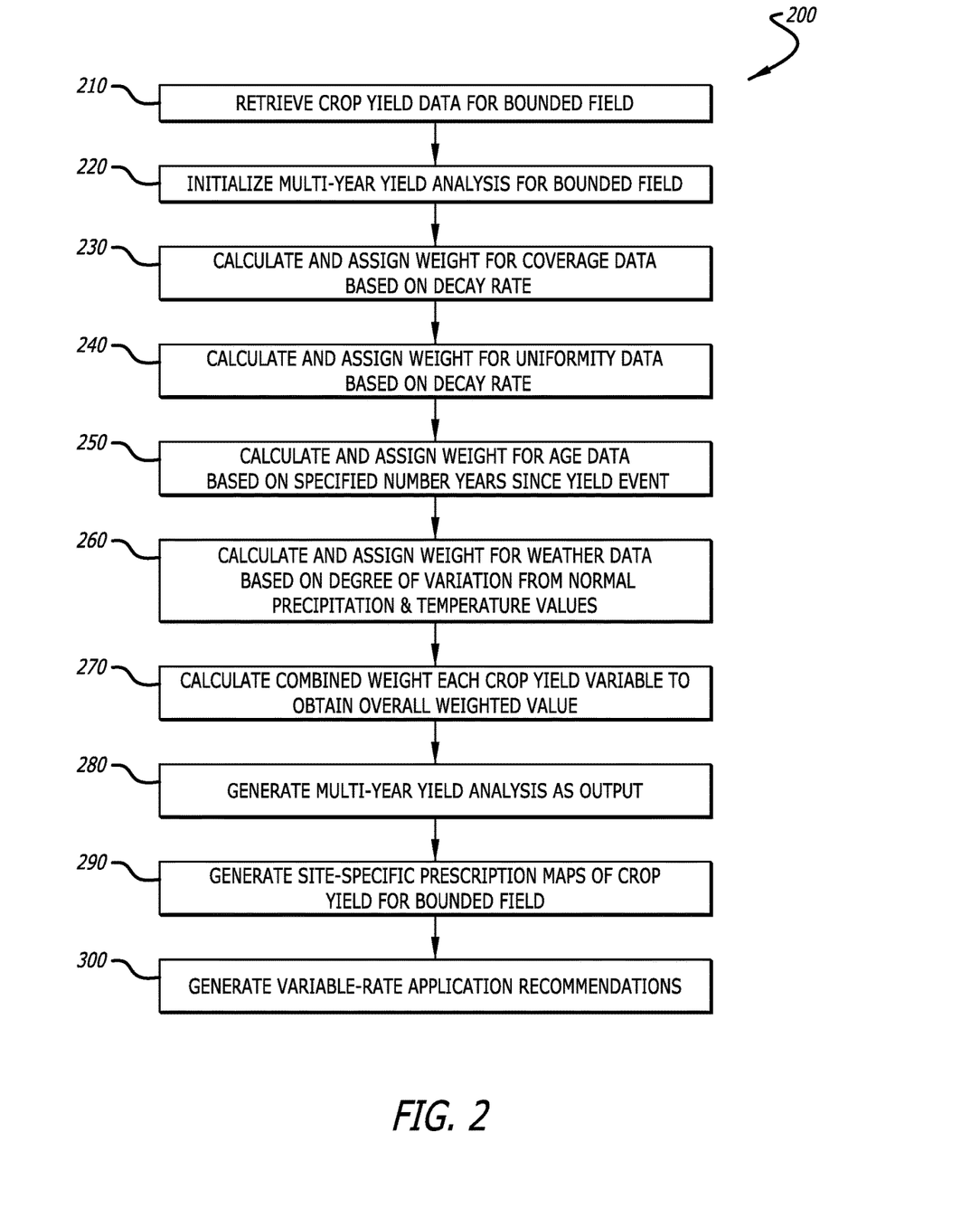
FIG. 2 is a diagram of a process of evaluating multiple layers of crop yield according to another aspect of the present invention.

FIG. 2 is a diagram of a process 200 of evaluating multiple layers of crop yield data 102 according to one embodiment of the present invention. The process 200 begins by retrieving, at step 210, multiple layers of crop yield data 102 for a selected, bounded field 104. Depending on the type of crop evaluation needed, a user of the process 200 may specify both the layers and variables of the input data 110 that are applied to the process 200, and may further specify coordinates of one or more bounded fields 104. The user may therefore customize the process 200, for example using the agronomic decision support tool 170 as noted above.

The process 200 initializes, at step 220, the multi-year crop yield analysis 140 for the bounded field 104, and the input data 110 may be parsed at this stage for the specific analytical components applied in the process 200 and the multi-year crop yield evaluation framework 100 as indicated in FIG. 1. The process 200 continues with calculating and assigning a weight to yield coverage data 111 representing the percentage 112 that the bounded field 104 is covered at step 230. As noted in FIG. 2, this may be based on an exponential decay rate of the yield coverage data 111. It is to be understood however that other methods of calculating and assigning a weight for yield coverage data 111 may be utilized, and that these methods may be used singularly or in combination to arrive at the weight to be assigned in step 230.

The process 200 continues by calculating and assigning weights to other variables in the input data 110. At step 240, the process 200 calculates and assigns a weight to yield uniformity data 113, representing as noted above a crop yield variation 114 in the bounded field 104. Calculating and assigning a weight in step 240 may be based on a linear decay rate of the yield uniformity data 113. It is to be understood however that other methods of calculating and assigning a weight for yield uniformity data 113 may be utilized, and that these methods may be used singularly or in combination to arrive at the weight to be assigned in step 240.

At step 250, the process 200 calculates and assigns a weight to yield age data 115, representing the number of years 116 since occurrence of a yield event in the bounded field 104, or as noted above the quality of the product data available. Calculating and assigning a weight in step 250 may be based on an age of collection for the yield event. For example, where a total number of yield events exceeds a specified number of years, a lower weight is applied to this variable of the input data 110. In this manner, older yield data is discounted at a particular rate, while more recent collection data is assigned a higher weight. It should be noted that the weight assigned for age data 115 may also be dependent on several additional factors, such as the type of crop planted and/or the product harvested, and conditions experienced in the field in the year of planting and harvest, such as for example weather conditions, soil characteristics, and pest and disease occurrence. Regardless, it is to be understood that other methods of calculating and assigning a weight for yield age data 115 may be utilized, and that these methods may be used singularly or in combination to arrive at the weight to be assigned in step 250.

At step 260, the process 200 calculates and assigns a weight to weather data 120 in the bounded field 104. Weather data 120 may include a plurality of variables as noted, such as temperature, precipitation, humidity, and other values. Calculating and assigning a weight in step 260 may be based on a deviation factor of one or more of temperature 121, precipitation 122, and other information 123 from expected or normal values. Also, multiple weights may be calculated, depending on the number of variables within the weather data 120.

These expected or normal values, as with age data, may be dependent on a number of other factors, such as the type of crop planted and/or product harvested. For example, if the yield data is related to a crop that is capable of withstanding a wider temperature range, a different weight may be assigned than for a crop that is more sensitive to temperature variation. Similarly, if the yield data is related to a crop that requires less water, a different weight may be assigned than for a crop that requires more water. The same is true for soil conditions in the bounded field 104, so that weights calculated and assigned for the weather data 120 may vary depending on soil conditions in the bounded field 104, as different types of soil, and the various contents and characteristics of soil, may result in crop yields with different temperature and precipitation variances. Soils may have markedly different characteristics in different parts of the same bounded field 104 as well, and it is to be understood the weights calculated and assigned to weather data 120 may further take this into account.

As noted above, weights for weather data 120 (and for uniformity, coverage, and age data) may also assigned according to a variety, cultivar or hybrid of a planted crop. In this manner, weightings may be influence and refined by specifics of the crop, so that a different weighting may result where a certain variation was planted in particular weather conditions. Weightings based on crop variations may therefore result in a weighting-of-weightings approach, in which a weight representing a combination of other weightings is applied, that produces a highly refined analysis of the crop yield based on specific characteristics of the crop. It should be noted that weights may be further refined by other crop-specific variables, such as where a particular nutrient or chemical was applied to mitigate a known pest or disease threat. Many other such considerations are possible when assigning weights in the present invention.

After step 260, weights have been calculated and assigned for each variable in the input data 110 representing the crop yield 102. At step 270, the present invention calculates a combined weight from the weights assigned to each variable comprising the input data 110 to obtain an overall weighted value. This overall value may be a weighted average of the various weights assigned, or may be calculated using one or more statistical probability models and other processes derived from mathematical formulas and analytical functions. Regardless, it is contemplated at step 270 that a single combined weight is generated and applied for the multi-year crop yield analysis 140, which is generated at step 280 as an output representing the modeled crop yield for further analysis in the process 200.

At step 290, the present invention applies the output of the multi-year crop yield analysis 140 to generate site-specific prescription maps 150 of crop yield for the bounded field 104. These prescriptions maps may be visualized in a number of different ways as suggested above, for any part, or all of, a bounded field 104. Regardless, the site-specific prescription maps are used to generate variable rate application recommendations 160 for the bounded field 104 at step 300. These include seeding, fertilizer, nutrient, irrigation, chemical, equipment usage, tillage, and any other agricultural application for a bounded field 104.

Many other elements or embodiments are possible and are within the scope of the present invention. For example, the multi-year crop yield evaluation framework 100 may include an in-situ or ground truth observation component that collects and analyzes yield event information during a growing season, for a comparison analysis to historical crop yield data from prior growing seasons. This comparison data may be incorporated in the calculation and assignment of weights for the variables comprising the input data 110. Yield event information from the current growing season may be useful to modulate data from prior growing seasons in a comparison analysis, for example to account for different crop treatments that have already been applied, and to account for up-to-the-minute crop, soil and field conditions.

It is to be further understood that the present invention may also be embodied in a software package, library, or other software-oriented component that provides all of the same functions within the multi-year crop yield evaluation framework 100 as described above. Alternatively, the present invention may be embodied in a hardware package, module, circuit board, chip, component, or other electronic hardware-oriented system that also provides all of these same functions. Such software and hardware each have multiple components capable of retrieving the data items necessary for practicing the present invention, and their timely updates. They also have multiple components capable of specifically performing the multi-year crop yield analysis, site-specific prescription mapping, and the variable rate application recommendation writing aspects of the present invention. As noted above, the present invention may also be embodied as one or more automated processes for agricultural decision-making and recommendation-making for generating prescription maps and creating and defining management zones from the multi-year crop yield analysis described herein for variable rate applications for the particular field.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
receiving, as input data, a layer of yield event information representing a single crop for a bounded field, the at least one layer of yield event information comprised of a plurality of variables that include a) coverage data as a percentage of the bounded field covered by a crop, b) uniformity data as a variation factor in a crop yield across the bounded field, c) age data as a number of years since the yield event information was collected, and d) weather data that includes both a temperature value for a particular year, and a precipitation value for the at least one layer;
analyzing the input data in one or more data processing modules within a computing environment in which the plurality of data processing modules are executed in conjunction with at least one processor, the one or more data processing modules configured to initialize one or more recommendations for a variable rate application for the bounded field based on a multi-year yield analysis of the yield event information, by
1) assigning a weight for the coverage data that decays at a rate beginning at a 90% coverage factor and approaching zero at a point between a 35% to 65% coverage factor,
2) assigning a weight for the uniformity data that decays at a linear rate starting between at an 80% uniformity factor and approaching zero at a 10% uniformity factor,
3) assigning a weight for the age data based on a collected age of the yield event when a total number of yield events exceeds a specified number of years,
4) assigning a weight for the weather data representing increasing decay as the precipitation value deviates further from a normal precipitation value, and as the temperature value deviates further from a normal temperature value, for a period of time represented by the at least one layer, and
5) combining the assigned weights for each of the plurality of variables into a single weighted value representing the yield event information; and
generating, as output data, one or more site-specific prescription maps of crop yield in the bounded field based on the multi-year yield analysis.

2. The method of claim 1, further comprising applying the one or more site prescription maps to an agronomic decision support tool.

3. The method of claim 2, wherein the agronomic decision support tool automatically defines a set of management zones, each management zone having a specific yield potential.

4. The method of claim 3, wherein the set of management zones are automatically defined for at least one of a seeding event, a nutrient treatment event, a chemical treatment event, and a tillage event.

5. The method of claim 3, wherein the agronomic decision support tool generates a recommendation for at least one of a variable rate application of seed for the field, a variable rate application of a nutrient for the field, a variable rate application of a pest control treatment for the field, and a variable rate application of a fertilizer for the field.

6. The method of claim 2, wherein the agronomic decision support tool enables a user to define a set of management zones, each management zone having a specific yield potential.

7. The method of claim 2, wherein the agronomic decision support tool enables a user override for assigning specific weights to the plurality of variables.

8. The method of claim 1, wherein the input data further comprises a plurality of layers of yield event information, each layer representing a single crop for a bounded field for one or more of a single year, a single crop growing season, or a single crop growth stage.

9. The method of claim 1, further comprising receiving, as additional input data, image data for the bounded field, representing at least one of the coverage data, the uniformity data, the age data, and weather data.

10. The method of claim 2, wherein the weather data includes long-range forecast data, and wherein the agronomic diagnostic tool enables a user override to specify particular climate characteristics and assign weights to yield event information to analyze specific weather conditions in the bounded field.

11. A system, comprising:
a computing environment including at least one non-transitory computer-readable storage medium having program instructions stored therein and a computer processor operable to execute the program instructions to initialize one or more recommendations for a variable rate application for a bounded field based on a multi-year yield analysis of the yield event information within one or more data processing modules, the one or more data processing modules including:
a data weighting component configured to 1) assign a weight for each variable in a plurality of variables relating to a layer of yield event information that represents a single crop for the bounded field, the weight for a coverage variable calculated by decaying coverage data at a rate beginning at a 90% coverage factor and approaching zero at a point between a 35% to 65% coverage factor, the weight for a uniformity variable calculated by decaying uniformity data at a linear rate starting between at an 80% uniformity factor and approaching zero at a 10% uniformity factor, the weight for an age variable determined based on a collected age of the yield event when a total number of yield events exceeds a specified number of years, and the weight for a weather variable calculated by increasingly decaying weather data as the precipitation value deviates further from a normal precipitation value, and as the temperature value deviates further from a normal temperature value, for a period of time representing the layer, and 2) combine each assigned weights for each of the plurality of variables into a single weighted value representing the yield event information; and
a mapping component configured to generate one or more site-specific prescription maps of crop yield in the bounded field based on the multi-year yield analysis.

12. The system of claim 11, wherein the one or more site-specific prescription maps are applied to an agronomic decision support tool.

13. The system of claim 12, wherein the agronomic decision support tool automatically defines a set of management zones, each management zone having a specific yield potential.

14. The system of claim 13, wherein the set of management zones are defined for at least one of a seeding event, a nutrient treatment event, a chemical treatment event, and a tillage event.

15. The system of claim 13, wherein the agronomic decision support tool is configured to generate a recommendation for at least one of a variable rate application of seed for the field, a variable rate application of a nutrient for the field, a variable rate application of a pest control treatment for the field, and a variable rate application of a fertilizer for the field.

16. The system of claim 12, wherein the agronomic decision support tool enables a user to define a set of management zones, each management zone having a specific yield potential.

17. The system of claim 12, wherein the agronomic decision support tool enables a user override for assigning specific weights to the plurality of variables.

18. The system of claim 11, wherein the plurality of variables further comprise a plurality of layers of yield event information, each layer representing a single crop for a bounded field for one or more of a single year, a single crop growing season, or a single crop growth stage.

19. The system of claim 11, further comprising receiving image data for the bounded field, representing at least one of the coverage data, the uniformity data, the age data, and weather data.

20. The system of claim 11, wherein the weather data includes long-range forecast data, and wherein the agronomic decision support tool enables a user override to specify particular climate characteristics and assign weights to yield event information to analyze specific weather conditions in the bounded field.

21. A method of performing a multi-year yield analysis in precision agriculture, comprising:
retrieving and initializing a plurality of input data, the plurality of input data including a layer of yield event information representing a single crop for a bounded field, the layer of yield even information comprised of a plurality of variables that include coverage data, uniformity data, age data, and weather data;
calculating a weight for each variable in the plurality of variables, the weight for the coverage data representing decay of the coverage data at a rate beginning at a 90% coverage factor and approaching zero at a point between a 35% to 65% coverage factor, the weight of the uniformity data representing decay of the uniformity data at a linear rate starting between at an 80% uniformity factor and approaching zero at a 10% uniformity factor, the weight of the age data based on a collected age of the yield event when a total number of yield events exceeds a specified number of years, and the weight of the weather data representing increasing decay based as the precipitation value deviates further from a normal precipitation value, and on as the temperature value deviates further from a normal temperature value, for a time period representing the layer;
calculating a combined weights for each of the plurality of variables into a single weighted value representing the yield event information; and
mapping the crop yield in one or more site-specific prescription maps in the bounded field.

22. The method of claim 21, further comprising automatically defining a set of management zones, each management zone having a specific yield potential, wherein the set of management zones are automatically defined for at least one of a seeding event, a nutrient treatment event, a chemical treatment event, and a tillage event.

23. The method of claim 21, further comprising generating one or more recommendations for a variable rate application for the bounded field.

24. The method of claim 23, wherein the one or more recommendations include at least one of a recommendation for variable rate application of seed for the field, a recommendation for variable rate application of a nutrient for the field, a recommendation for variable rate application of a pest control treatment for the field, and a recommendation for variable rate application of a fertilizer for the field.

25. The method of claim 21, wherein the coverage data represents a percentage of the bounded field covered by a crop, the uniformity data represents a variation factor in a crop yield across the bounded field, the age data represents a number of years since the yield event information was collected, and the weather data includes both a temperature value for a particular year, and a precipitation value for the particular year.

26. The method of claim 21, wherein the input data further comprises a plurality of layers of yield event information, each layer representing a single crop for a bounded field for one or more of a single year, a single crop growing season, or a single crop growth stage.

27. The method of claim 21, further comprising receiving, as additional input data, image data for the bounded field, representing at least one of the coverage data, the uniformity data, the age data, and weather data.

28. The method of claim 21, further comprising applying the one or more site-specific prescription maps to an agronomic decision support tool.

29. The method of claim 28, wherein the agronomic decision support tool enables a user to define a set of management zones, each management zone having a specific yield potential, and enables a user override for assigning specific weights to the plurality of variables.

30. The method of claim 28, wherein the weather data includes long-range forecast data, and wherein the agronomic decision support tool enables a user override to specify particular climate characteristics and assign weights to yield event information to analyze specific weather conditions in the bounded field.

* * * * *